United States Patent [19]

Fieldus

[11] Patent Number: 4,492,340
[45] Date of Patent: Jan. 8, 1985

[54] VALVE ARRANGEMENTS FOR PROPULSIVE FLUID

[75] Inventor: Geoffrey H. Fieldus, Kingston-upon-Thames, England

[73] Assignee: British Aerospace Public Limited Company, London, England

[21] Appl. No.: 433,444

[22] Filed: Oct. 8, 1982

[30] Foreign Application Priority Data

Oct. 12, 1981 [GB] United Kingdom ............... 81306617

[51] Int. Cl.³ ......................... B64C 15/00; F02K 1/00
[52] U.S. Cl. ........................... 239/265.25; 239/265.19; 137/883
[58] Field of Search ....................... 239/265.19, 265.25, 239/127.1; 244/12.1, 12.3, 23 A, 23 B, 23 R, 52; 60/242; 137/219, 883, 885

[56] References Cited

U.S. PATENT DOCUMENTS 1,362,331 12/1920 Larner ................................. 137/219
2,699,647 1/1955 Goebel ............................ 239/127.1
3,989,191 11/1976 McCullough ................. 239/265.19
4,330,012 5/1982 Chadwick ........................... 137/219

Primary Examiner—Jeffrey V. Nase
Assistant Examiner—James R. Moon, Jr.
Attorney, Agent, or Firm—Cushman, Darby & Cushman

[57] ABSTRACT

A valve 10 for controlling the flow of propulsive fluid, for use for example in the reaction control system of a VTOL aircraft includes a generally muff-shaped manifold member 15, a hollow piston member 21, and a propulsive jet outlet 16. The manifold member 15 includes an inlet 17 and a cylindrical inner wall 18 itself defining a bore, and together with jet outlet 16 defining an annular port 19. The piston member 21 is slidably housed in the bore for movement between a position in which the port 19 is open to allow propulsive fluid to pass through the manifold to jet outlet 16 and a position in which the port is closed. Movement of the hollow piston member may be effected by fluid operated jack arrangement 25 housed at least partially within the piston.

11 Claims, 6 Drawing Figures

VALVE ARRANGEMENTS FOR PROPULSIVE FLUID

This invention relates to valves for controlling the flow of propulsive fluid and in particular but not exclusively to such valves for use as reaction control valves for a vertical take-off and landing (VTOL) fixed-wing aircraft such as the "Harrier" type of aircraft.

The "Harrier" type of aircraft employs lift nozzles for vertical take-off and landing which nozzles are capable of orientation between a generally downwardly directed position in which they provide downward thrust and a generally rearwardly directed position in which they provide thrust for forward flight. This type of aircraft also includes a reaction control system which includes reaction control valves situated at the wing tips (for roll control) and at the tail of the aircraft (for pitch and yaw control)

The control valves of the reaction control system stabilize the aircraft in the roll, pitch and yaw senses when the normal control surfaces of the aircraft are ineffective due to zero or inadequate forward speed, propulsive fluid being emitted from the valves as a function of the pilot's control demand, the valves being operable to vary the effective area of discharge of the nozzle.

Propulsive fluid for the reaction control system is tapped from the compressor of the main engine and ducted to the individual control valves, the duct flow being controlled by a master control valve whose operation is linked with that of the lift nozzles. Thus, the master control valve will automatically be opened when the lift nozzles have been moved to a pre-determined angular position relative to the horizontal axis of the aircraft and closed when the lift nozzles have been moved into a position such that the forward speed of the aircraft is higher than stalling speed.

In the existing arrangement of the reaction control system presently used on the "Harrier" aircraft, the control valves are pivotally mounted clam-type shutter valves operated by mechanical interconnection with the conventional flying controls. It is found, however, that significant leakage may occur from this form of control valve when in the closed position. It is now intended to provide a form of valve arrangement which may be actuated by means of a fluid-operated jack which is operated under the control of an on-board flight computer, and in which the amount of leakage from the valve when in the closed position may be reduced.

According to this invention, there is provided a valve arrangement for controlling the flow of a propulsive fluid which arrangement includes a manifold member, a piston member and propulsive jet outlet means, said manifold member having an inlet for propulsive fluid and one or more walls defining a generally cylindrical bore, the wall or walls including one or more ports arranged around an annular region of said bore to allow flow communication between the manifold member and the propulsive jet outlet means, the piston member being slidably received in the bore for sliding movement between a closed position in which the one or more ports is sealingly closed by said piston member and an open position in which the one or more ports is open to allow fluid to flow from the manifold member to the propulsive jet outlet means.

Preferably, the cylindrical bore includes an inwardly-directed annular abutment arranged adjacent one or more port and said piston member includes an annular sealing face adjacent its crown region for sealingly contacting the annular abutment when the piston member is in its closed position.

Conveniently, the propulsive jet outlet means is of generally circular cross-section, defining an extension of the cylindrical bore.

Preferably, the valve arrangement further includes a fluid-operated jack arrangement to effect sliding movement of the piston member within the cylindrical bore, and the jack is advantageously housed at least partially within said piston member.

Preferably, the valve arrangement includes means to effect induction of ambient fluid through the piston member to effect heat transfer. This may be achieved by providing one or more apertures in the crown of the piston member.

Where the cylindrical bore includes an annular abutment, the crown of the piston member is preferably generally conical in shape and the annular abutment is rounded to provide a generally smooth walled slot for the propulsive fluid when the piston is in its open position, thereby to minimise turbulence in the efflux of the valve arrangement.

By way of example only, certain specific embodiments of this invention will now be described in detail, reference being made to the accompanying drawings, in which.

Figure 1:
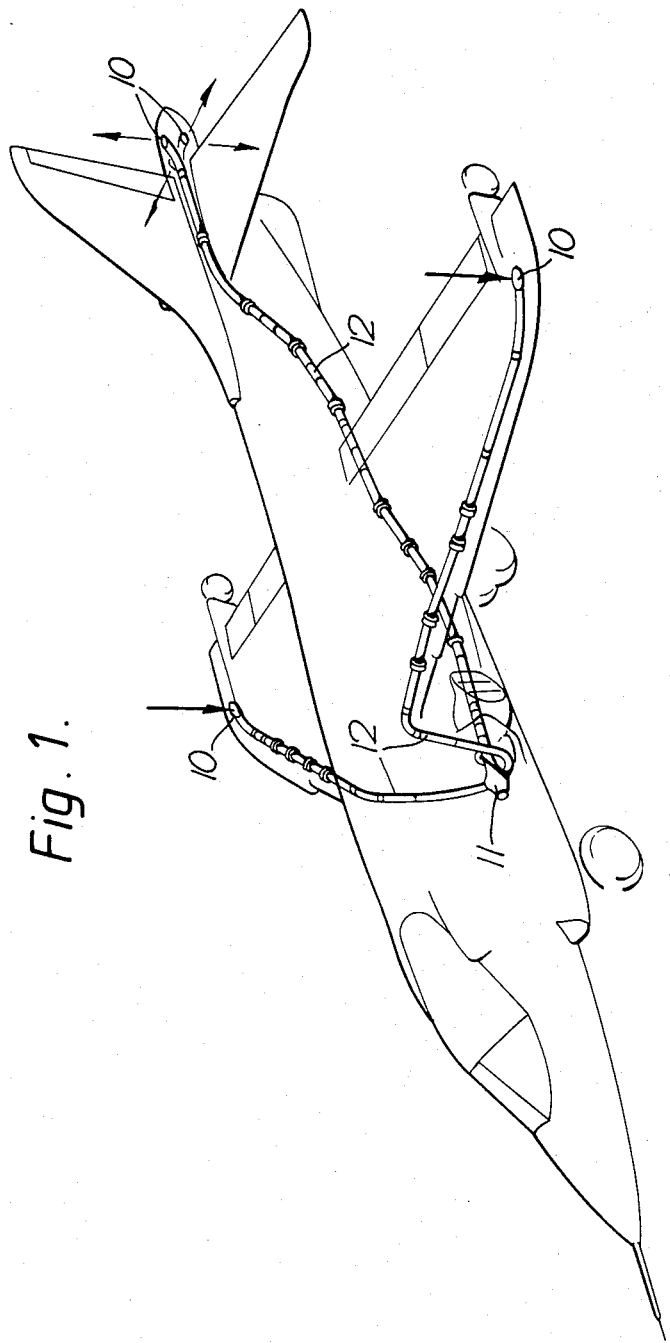
FIG. 1 is a general schematic view of a vertical take-off and landing aircraft incorporating a reaction control system.

Referring initially to FIG. 1, there is shown a vertical take-off and landing aircraft which incorporates a reaction control system. The system includes six control valves 10, two located at opposed wing tips and four located in the tail of the aircraft. Propulsive fluid is tapped from the compressor of the main engine (not shown) and passes via a master control valve 11, through ducting 12, to each of the control valves 10.

Figure 2:
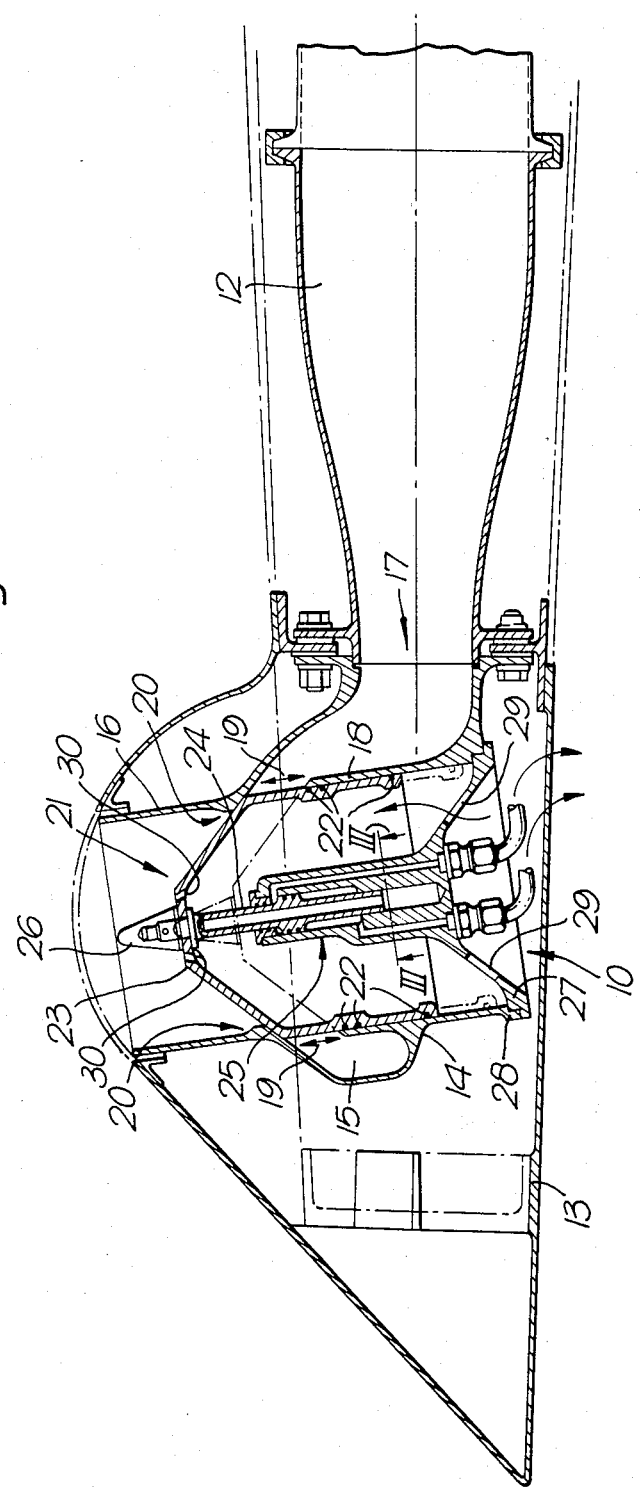
FIG. 2 is a section view through a part of a wing tip of the the aircraft of FIG. 1 showing a first embodiment of the valve arrangement.
Figure 3:
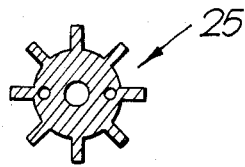
FIG. 3 is a section view on lines III—III of FIG. 2.
Figure 4:
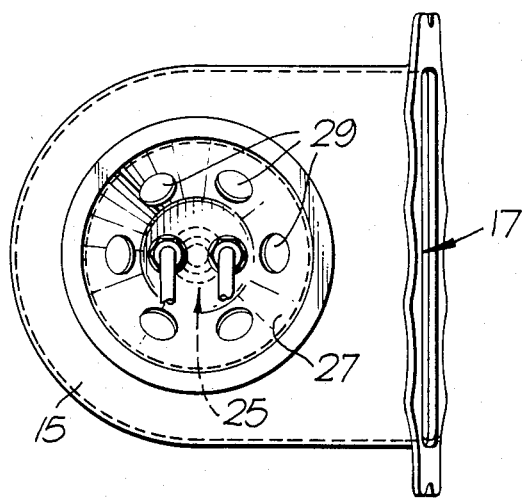
FIG. 4 is an end view of the arrangement of FIG. 2.

Referring now to FIGS. 2 to 4, there is shown a first embodiment of control valve arrangement 10 which has been fitted within a wing section, inboard of the tip rib 13 of the wing, to direct propulsive fluid in a generally vertical direction. The valve arrangement 10 comprises a valve body 14 defined by a manifold portion 15 and a propulsive jet outlet portion 16. The manifold portion 15 is generally muff-shaped, having an inlet 17 for connection to ducting 12, and a generally cylindrical inner wall 18 defining a bore. The propulsive jet outlet portion 16 is arranged coaxially with the inner wall 18 of the manifold portion 15, but spaced axially therefrom to provide an annular port 19 which may allow a flow communication from the manifold portion 15 to the propulsive jet outlet portion 16. An inwardly directed annular rib 20 of smoothly curved profile is provided around that region of the propulsive jet outlet portion 15 adjacent annular port 19.

A hollow piston member 21 is slidably received in the cylindrical bore and includes a number of carbon seals 22 sprung urged outwardly against the bore to effect a sealing fit. The piston member 21 has a generally frustoconical crown portion 23 and the piston rod 24 of a fluid operated jack arrangement 25 is attached to the apex region of the crown portion 23 by means of a threaded boss 26. Inlet and outlet fluid supplies are provided for the jack arrangement 25 to effect movement of the piston member between a closed position (shown in full lines in FIG. 2) in which an annular tapered region of the crown portion 23 seemingly contacts the annular rib 20, and a fully-open position(shown in chain-dotted lines in FIG. 2) in which the crown portion 23 lies contiguous with wall 18, adjacent the annular port 19, so as to define a slot through which propulsive fluid may flow to the propulsive jet outlet portion 16.

The jack arrangement 25 is secured to the valve body 24 by means of a screwed threaded circular flange portion 27 which engages a correspondingly threaded portion 28 on the valve body.

Each of the flange portion 27 and the crown portion 23 of the piston member 21 is provided with a plurality of orifices 29, 30 spaced around their respective axes, and the jack arrangement 25 is provided with a finned body (FIG. 3). When the piston member is in a partially or fully open position, fluid at ambient temperature is drawn through orifices 29, 30 under the influence of the propulsive fluid exhausting through the propulsive jet outlet portion 16 and the induced flow serves to cool the jack arrangement 25.

Figure 5:
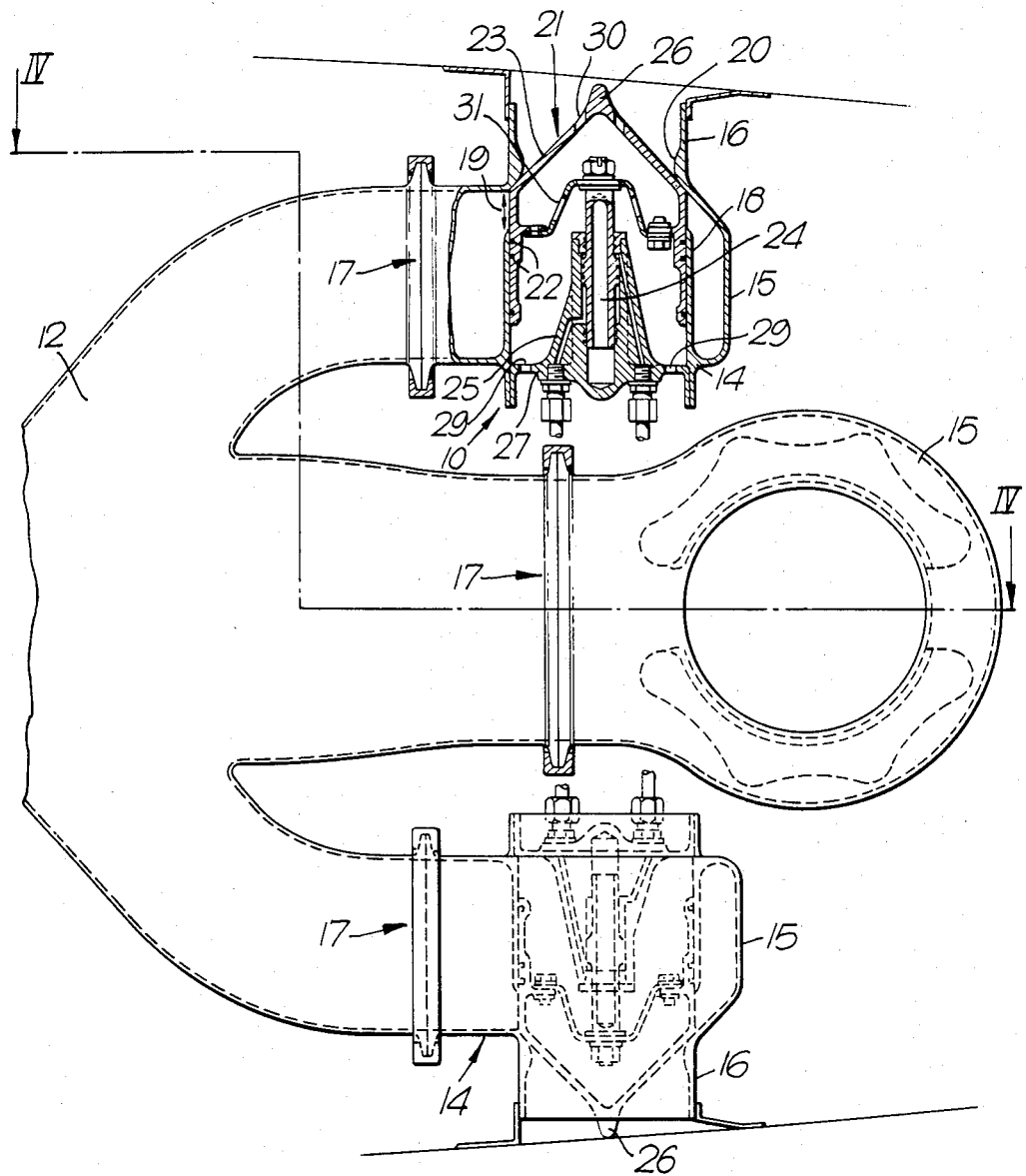
FIG. 5 is a section view through a part of the tail of the aircraft of FIG. 1.
Figure 6:
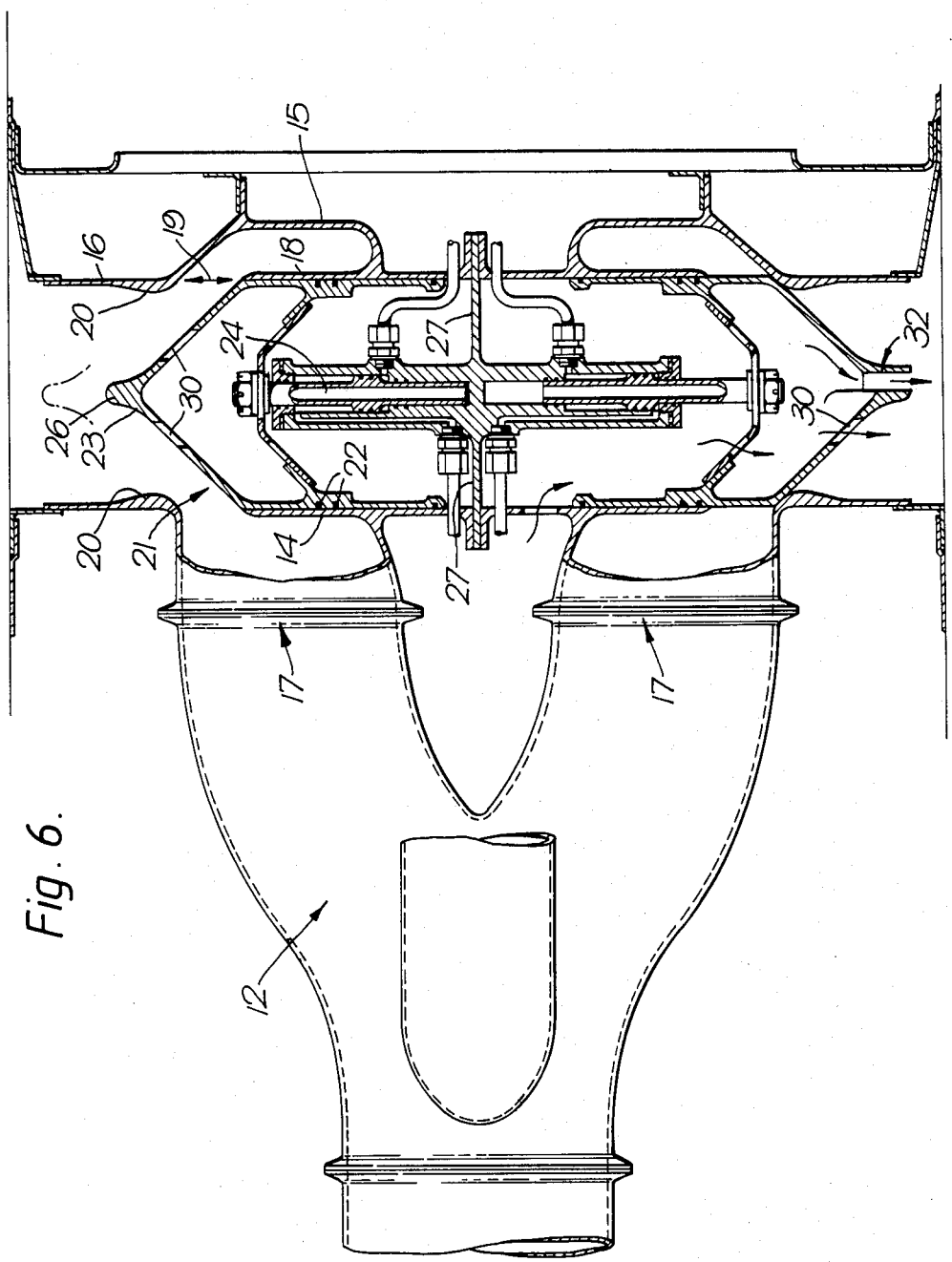
FIG. 6 is a section view taken on line IV—IV of FIG. 5.

Referring now to FIGS. 5 and 6, there is shown a configuration of the control valves of this invention arranged in detail on an aircraft for effecting control in the pitch and yaw senses.

Ducting 12 extends rearwardly from the master control valve 11 and incorporates a multiple termination at its rearward end. A main bifurcated portion supplies gas to the upper and lower pitch control valves, whilst lateral duct branches supply the port and starboard yaw control valves. Certain parts shown in FIGS. 5 and 6 are similar to those shown in the preceding Figures. Such parts are given like reference numerals and will not be described again.

In FIG. 5 there are shown in section the port and starboard yaw control valves. In these valves, the form of piston member 21 and its attachment to piston rod 24 are different as compared to the valve arrangement shown in FIG. 2; in the yaw control valves, the crown portion of the piston member 21 is generally conical in shape and the separate boss 26 of the previous arrangement is replaced by an integral shaping of the piston member. The piston rod 24 of the hydraulic jack arrangement 25 is attached to the piston member 21 by means of a subframe member 31 arranged within the piston.

In FIG. 6 there are shown in section the pitch control valves. In these valves, the hydraulic jack arrangements 25 are located back-to-back and the piston members 21 are generally similar to those employed in the yaw control valves. An alternative form of single outlet orifice 30 for induced ambient fluid is shown at 32.

In each of the above embodiments the annular rib 20 and the region of the crown portion 23 of the piston member 21 which contacts it are shaped both to provide efficient complementary sealing surfaces, and to minimize the amount of turbulence present in the efflux of the arrangement when the piston member is in an open position. Similarly, the shaping of boss 26 is selected to reduce turbulence in the efflux. Other aerodynamic shapings of the surfaces which the propulsive fluid contacts prior to exhausting through the propulsive jet outlet means 16 may be effected to reduce turbulence, without departing from the invention.

Spring loading may be provided to urge the piston member 21 to its fully closed position to further reduce the losses of the valve arrangement.

In the existing arrangements of shutter type valves, the operating losses are of on the order of three to five lbs. per second. The above described embodiments of valve offer savings of up to 20% on these losses. Moreover, the above described embodiments provide a relatively compact arrangement which may be housed within a confined space, for example a wing tip.

We claim:

1. A valve arrangement for controlling the flow of a propulsive fluid in a reaction control system, said arrangement being adapted to receive propulsion fluid in a given direction and to controllably exhaust it in a direction generally perpendicular to said given direction, said valve arrangement comprising:

a generally muff-shaped manifold member, including manifold inlet means extending generally radially away therefrom and adapted to receive propulsion fluid from a propulsion fluid source and having a wall defining a cylindrical bore extending generally perpendicular to said inlet means, said wall also defining, adjacent one end of said bore, annular slot means through which propulsion fluid may leave said manifold;

propulsion jet outlet means arranged substantially coaxially with respect to said bore and being in flow communication therewith;

a piston member slidably received in said bore for movement between a closed position in which it sealingly closes said annular slot means and an open position in which said annular slot means is opened to allow propulsive fluid to pass from the manifold member via said annular slot means to exhaust through said propulsion jet outlet means; and actuator means coupled to said piston member and operable to effect movement of the piston member between its open and closed positions.

2. A valve arrangement according to claim 1, wherein the cylindrical bore includes an inwardly-directed annular abutment arranged adjacent said annular slot means and said piston member includes an annular sealing face adjacent its crown region for sealingly contacting the annular abutment when the piston member is in its closed position.

3. A valve arrangement as claimed in claim 1, which further includes a fluid-operated jack arrangement to effect sliding movement of the piston member within the bore.

4. A valve arrangement as claimed in claim 3, wherein the piston member is generally hollow and the jack arrangement is housed at least partially within said piston member.

5. A valve arrangement as claimed in claim 1, which includes induction means to effect induction of fluid through said piston member to effect heat transfer.

6. A valve arrangement as claimed in claim 5, wherein said induction means include one or more apertures provided in the crown of said piston member.

7. A valve arrangement as claimed in claim 1, wherein the crown of said piston member is generally conical in shape.

8. A valve arrangement according to claim 2, wherein said abutment is rounded to provide a generally smooth walled slot for the propulsive fluid when the piston is in its open position, thereby to minimise turbulence in the efflux of the valve arrangement.

9. A valve arrangement according to claim 1, wherein the cross-sectional area of said inlet means is substantially equal to that of said jet propulsion outlet means.

10. A valve arrangement according to claim 1, wherein said actuator is coupled between a plate member secured to an end region of said muff-shaped manifold member remote from said propulsion jet outlet means and said piston member.

11. A reaction control system, used in an aircraft of the vertical and short take-off type, for effecting control of said aircraft when its speed is insufficient to enable control by means of conventional aerodynamic control surfaces, said reaction control system comprising:
a plurality of duct means each connected at one end to a propulsive fluid supply source;
a plurality of controllable propulsion jet outlet assemblies, located in a region of the aircraft remote from its centre of gravity, each of said propulsion jet outlet assemblies including a generally muff-shaped manifold member including a manifold inlet in flow connection with the outer end of a respective one of said plurality of duct means and extending generally radially with respect to said manifold member, and having a wall defining a generally cylindrical bore extending generally perpendicular to said inlet means, said wall also defining, adjacent one end of said bore, annular slot means through which propulsion fluid may leave said manifold member;
propulsion jet outlet means arranged substantially coaxially with respect to said bore and being in flow communication therewith;
a piston member slidably received in said bore for movement between a closed position in which it sealingly closes said annular slot means and an open position in which said annular slot means is opened to allow propulsive fluid to pass from the manifold member via said annular slot means to exhaust through said propulsion jet outlet means; and
actuator means coupled to said piston member and operable to effect movement of the piston member between said open and closed positions.

* * * * *

UNITED STATES PATENT AND TRADEMARK OFFICE
CERTIFICATE OF CORRECTION

PATENT NO. : 4,492,340
DATED : January 8, 1985
INVENTOR(S) : Geoffrey H. FIELDUS It is certified that error appears in the above—identified patent and that said Letters Patent is hereby corrected as shown below:

On the Title Page re Priority Data [Item 30]

Read "Oct. 12, 1981 [GB] United Kingdom ...81306617" as

-- Oct. 12, 1981 [GB] United Kingdom ...8130617 --

Signed and Sealed this

Seventeenth Day of September 1985

[SEAL]

Attest:

Attesting Officer

DONALD J. QUIGG

Commissioner of Patents and
Trademarks—Designate